United States Patent [19]
Wheeler

[11] Patent Number: 5,695,201
[45] Date of Patent: *Dec. 9, 1997

[54] PACKING MEMBER WITH REDUCED FRICTION

[75] Inventor: Wallace Wheeler, Dallas, Tex.

[73] Assignee: The Texacone Company, Mesquite, Tex.

[ * ] Notice: The term of this patent shall not extend beyond the expiration date of Pat. No. 5,509,670.

[21] Appl. No.: 598,437

[22] Filed: Feb. 8, 1996

Related U.S. Application Data

[63] Continuation-in-part of Ser. No. 331,126, Oct. 28, 1994, Pat. No. 5,509,670.

[51] Int. Cl.$^6$ .............................. F16J 15/32; F16J 15/48; F16J 9/08
[52] U.S. Cl. .................. 277/205; 277/188 R; 277/227; 277/230
[58] Field of Search .................. 277/188 R, 205, 277/221, 188 A, 227, 230, 123, 124

[56] References Cited

U.S. PATENT DOCUMENTS 5,377,999  1/1995  Gorman .................. 277/221
5,509,670  4/1996  Wheeler .................. 277/188 R

*Primary Examiner*—William A. Cuchlinski
*Assistant Examiner*—Christina Annick
*Attorney, Agent, or Firm*—Michael A. O'Neil

[57] ABSTRACT

A packing member having an annular body with a circular outer wall and circular inner wall, with first and second end walls extending between the inner and outer walls includes a relatively soft upper portion formed from an elastomeric polymeric material having a Shore A hardness of between about 65 and 80 and a fabric reinforced, harder lower portion formed from elastomeric polymeric material having a Shore A hardness greater than the Shore A hardness of the upper portion. A groove, having a lower wall extends axially into said annular body through the first end wall and defines a plane perpendicular to an annular axis. The upper portion of the annular body includes inner and outer sealing lips formed adjacent to at least a portion of the groove, the outer sealing lip extending vertically beyond the inner sealing lip and the inner sealing lip having an inner sealing edge intersected by the plane defined by the lower wall of the groove. The inner sealing lip is inclined inwardly to form the sealing edge for sealing engagement when in slidable contact with a separate moveable part. In one embodiment, the packing member includes a dovetail joint extending radially through the annular body.

20 Claims, 3 Drawing Sheets

PACKING MEMBER WITH REDUCED FRICTION

CROSS REFERENCE TO RELATED APPLICATION

This application is a continuation-in-part of U.S. application for patent Ser. No. 08/331,126, filed Oct. 28, 1994, now U.S. Pat. No. 5,509,670 dated Apr. 23, 1996.

TECHNICAL FIELD

The present invention relates to hydraulic sealing devices and more particularly to an improved packing member for forming a seal between a cylinder and a moveable shaft extending through the cylinder.

BACKGROUND OF THE INVENTION

It is common practice to form a seal between the wall of an opening and a shaft or other cylindrical member extending through the opening by positioning a packing member between the wall of the opening and the outer surface of the member. Packing members are typically annular bodies having a generally V-shaped or truncated V-shaped cross-section. Packing members are, in many cases, formed from an elastomeric material such as rubber or plastic. One such packing member is disclosed in U.S. Pat. No. 4,526,385, issued Jul. 2, 1985.

The operation of a device such as a hydraulic cylinder, typically involves both static and dynamic forces generated by the friction between the packing member and the shaft. Static friction must be overcome during the initial actuation of the cylinder whereas dynamic friction is encountered during continued movement of the shaft. The amount of friction between the shaft and the packing member is determined by a number of factors including the amount of surface area of the packing member in contact with the shaft. Preferably, the amount of friction between the shaft and the packing member is minimized while maintaining an effective seal.

The amount of force required to overcome static friction and initially move the shaft is typically greater than the force required to overcome dynamic friction after the shaft has started moving. Since the amount of force required to overcome static friction is greater than the amount of force needed to overcome dynamic friction, static friction is an important consideration in the selection and design of packing members. Moreover, during the operation of a hydraulic cylinder, a large difference between the force required to overcome static friction and the force required to overcome dynamic friction may result in the cylinder jerking or "stuttering" during operation. Large hydraulic and mechanical stresses can be generated when a hydraulic cylinder jerks in such a manner, stresses that may damage or cause excessive wear of system components, for example hydraulic valves, fittings and the hydraulic pump supplying pressurized fluid to the cylinder. Consequently, it is desirable not only that the friction between packing member and a slidable member passing through the packing member be minimized, but also that the difference in the amount of force required to overcome static versus dynamic friction be minimized.

SUMMARY OF THE INVENTION

The present invention provides a packing member with reduced friction and with a reduced static/dynamic load ratio.

The packing member has an annular body including a relatively soft upper portion formed from an elastomeric polymeric material having a Shore A hardness of between about 60 and 85 and a fabric reinforced, harder lower portion formed from elastomeric polymeric material having a Shore A hardness greater than the Shore A hardness of the upper portion. A groove, having a lower wall extends axially into said annular body through the first end wall and defines a plane perpendicular to an annular axis. The upper portion of the annular body includes inner and outer sealing lips formed adjacent to at least a portion of the groove, the outer sealing lip extending vertically beyond the inner sealing lip and the inner sealing lip having an inner sealing edge intersected by the plane defined by the lower wall of the groove. The inner sealing lip is inclined inwardly at an angle of from about 10° to about 30° to form the sealing edge for sealing engagement when in slidable contact with a separate moveable part. The upper portion of the packing member may be formed from a nitrile rubber having a Shore A hardness of between about 60 and 85 and the harder lower portion may be made from a fabric reinforced nitrile rubber having a Shore A hardness of between about 70 and 90, but greater than the Shore A hardness of the softer upper portion. The softer upper portion of the packing member serves to form a seal between the wall of an opening and a shaft or other cylindrical member extending through the opening while the harder lower portion tends to reinforce the packing member, resisting deformation due to compressive forces. The packing member may be provided with a plurality of openings extending axially into the annular body of the packing member to permit fluid acting on the end wall to actuate the outside sealing lip for sealing engagement with a surrounding member.

DETAILED DESCRIPTION

Figure 1:
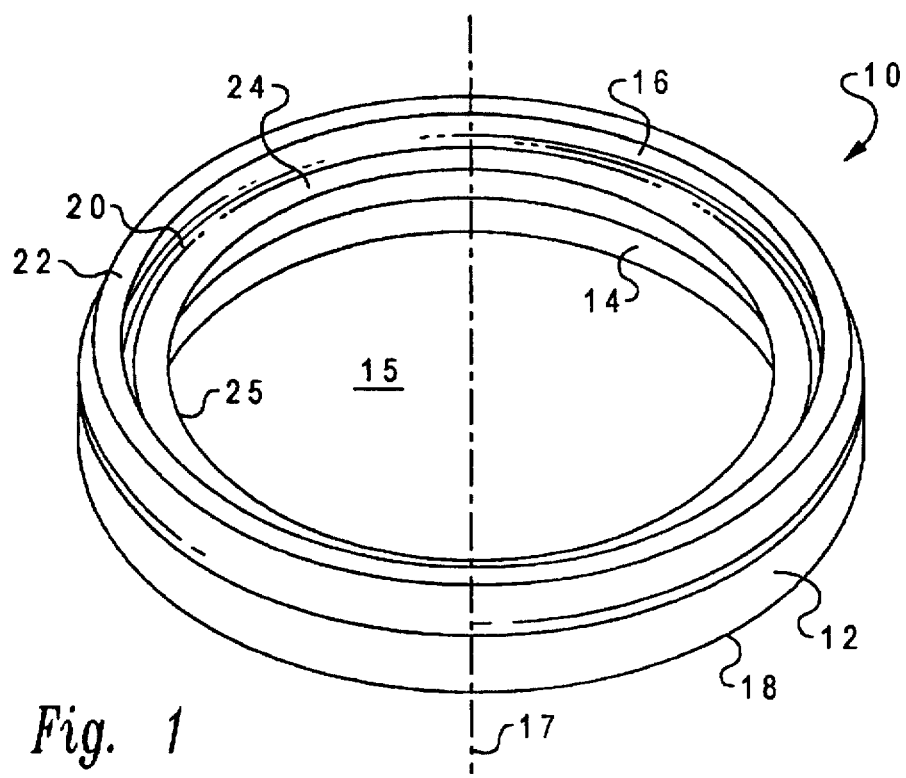
FIG. 1 is a perspective drawing of one embodiment of a packing member of the present invention.
Figure 4:
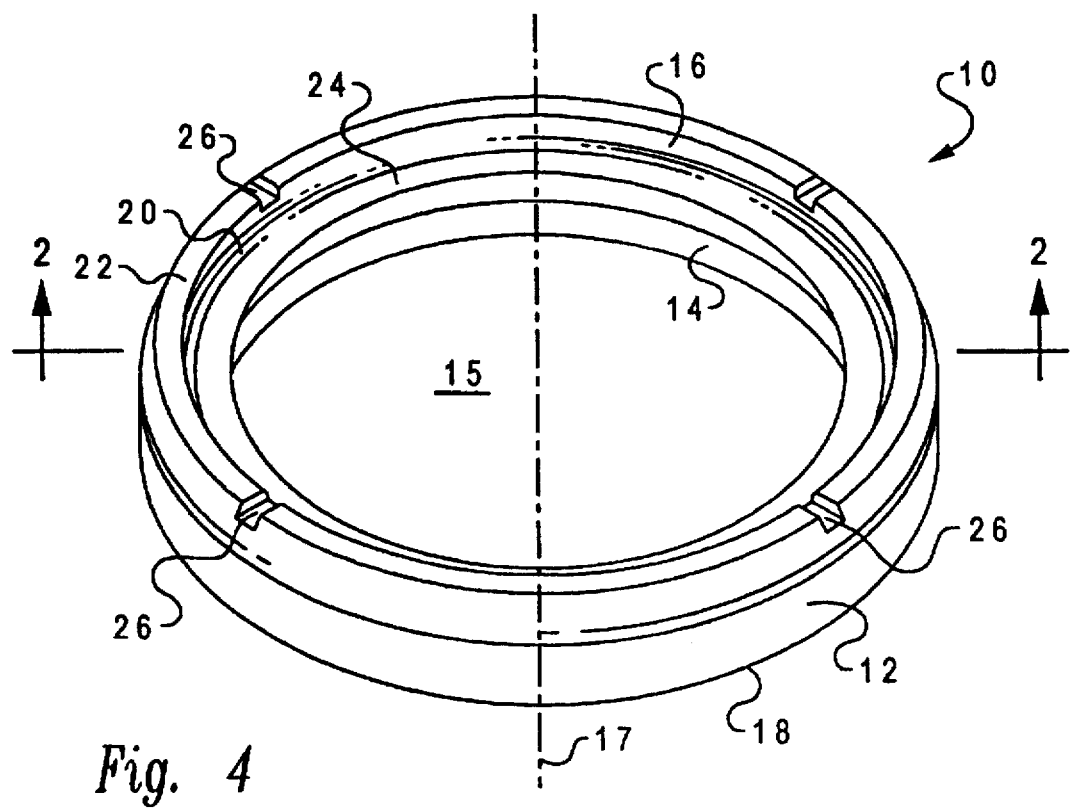
FIG. 4 is a perspective drawing of an alternate embodiment of the packing member of the present invention.

Referring now to the drawings where like reference characters designate like or similar parts throughout, and specifically to FIGS. 1 and 4, a first embodiment of a packing member 10 in accordance with the present invention is illustrated therein. Packing member 10 comprises an annular body having a circular outer wall 12 and a circular inner wall 14 that defines circular opening 15 and annular axis 17. The annular body further includes first and second end walls 16 and 18, respectively, extending between the inner and outer walls 12 and 14.

As illustrated in FIG. 1, the first end wall 16 has a groove 20 formed therein defining an outer sealing lip 22 and an inner sealing lip 24 having an inner sealing edge 25. As shown in FIG. 4, packing member 10 may optionally be provided with a plurality of openings 26, illustrated as rectangular shaped slots passing through end wall 16, extending axially into the annular body of packing member 10 from equally spaced points along a circle extending around the top surface of outer sealing lip 22. Depending upon the application, openings 26 may be provided to permit fluid acting on end wall 16 to actuate outside sealing lip 22 into sealing engagement with a surrounding member.

Figure 2:
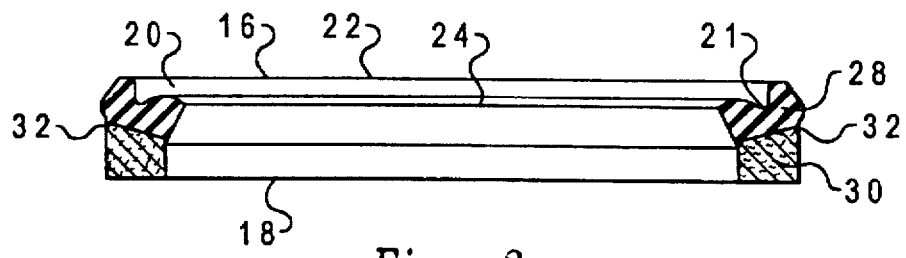
FIG. 2 is a vertical sectional view of the packing member as illustrated in FIG. 4 taken along line 2—2.
Figure 3:
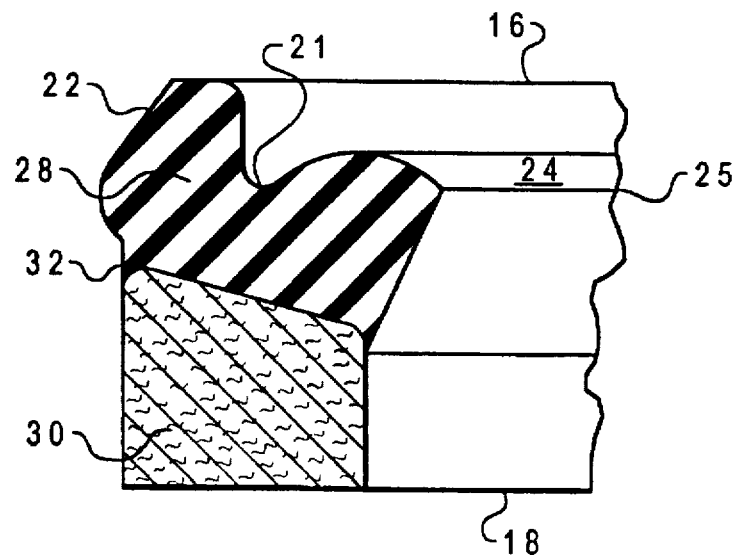
FIG. 3 is a further enlarged fragmentary vertical sectional view of the packing member shown in FIG. 2.
Figure 5:
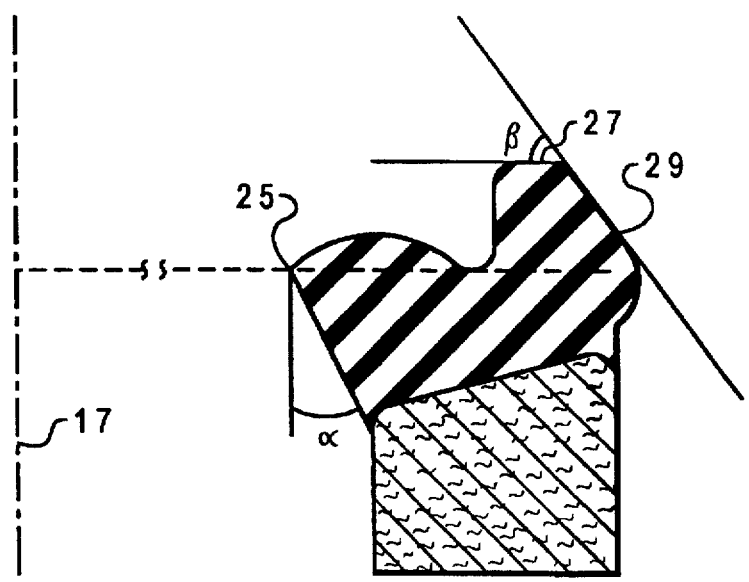
FIG. 5 is a sectional view of a packing member of the present invention, further illustrating the construction of the packing member.

Turning now to FIGS. 2, 3 and 5 the annular body of the packing member 10 includes an upper portion 28 and a lower portion 30. Upper portion 28 includes inner sealing lip 24, inner sealing edge 25 and outer sealing lip 22. Groove 20 includes bottom wall 21 and as best illustrated in FIG. 5 the lowermost portion of bottom wall 21 is positioned in a horizontal plane intersecting sealing edge 25, the horizontal plane being perpendicular to annular axis 17.

Lower portion 30 of the packing member 10 may be formed from a fabric or fibrous material such as a cotton fabric impregnated with a material such as an elastomeric polymer, a resilient thermoplastic or thermosetting material and/or a material such as a rubber or rubber like polymer. Preferably, lower portion 30 is formed from a fabric impregnated with a rubber or rubber type polymer having a 70–90 durometer reading on the Shore A durometer scale.

Upper portion 28 is also formed from a rubber or rubber-like polymer, however, upper portion 28 does not include fabric reinforcement and is typically formed from a softer material than is used to form lower portion 30. The difference in the Shore A durometer reading between the material used to form the upper portion 28 and lower portion 30 being in the range of from about 10 to about 30. Preferably, upper portion 28 is formed from a rubber or rubber-like polymer having a 60–85 durometer reading on the Shore A durometer scale. In one embodiment, upper portion 28 is formed from a nitrile rubber having a 70 durometer reading on the Shore A durometer scale while lower portion 30 is formed from a fabric reinforced nitrile rubber having a 90 Shore A durometer reading. Thus, the upper portion 28 of the packing member 10 tends to be more elastic and deformable during operation than the lower portion 30 which is formed from a harder, fabric reinforced rubber.

In operation, the upper portion 28 of the packing member 10 is subject to compressive forces that tend to urge inner sealing lip 24 into sealing engagement with a shaft or other cylindrical member inserted within opening 15 that is to be sealed against the passage of a fluid such as hydraulic fluid. The compressive forces also tend to force outer sealing lip 22 into sealing engagement with a separate surrounding member.

Fiber reinforced lower portion 30 of the packing member 10 is designed to act as a stiffener, reinforcing packing member 10 and resisting deformation when packing member 10 is subjected to compressive forces. Lower portion 30 of packing member 10 is designed and sized so as not to contact the slidable member passing through opening 15 during normal operation, or to have minimal contact with the slidable member, thereby limiting the surface area of the packing member in contact with the slidable member. Thus, the sealing function of the packing member 10 of the present invention is to be performed primarily by upper portion 28 with lower portion 30 serving to reinforce the upper portion 28 during operation.

As best illustrated in FIG. 3, the interface 32 between the upper portion 28 and the lower portion 30 is angled upwardly from the inside to the outside of the packing member 10 at an angle of from about 10° to about 30°, such that the volume of the softer durometer rubber between inner sealing lip 24 and outer sealing lip 22 and lower portion 30 is approximately the same in the radial direction. It will be appreciated that the flexibility of inner sealing lip 24 and outer sealing lip 22 is determined, at least in part, by the amount of softer durometer rubber between the sealing lips 24 and 22 and the fabric reinforced lower portion 30 of the packing member 10. By controlling the volume of softer durometer rubber between sealing lips 24 and 22 and the fabric reinforced lower portion 30, the amount of radially applied force required to deform the sealing lips may be increased or decreased, thereby increasing the effectiveness of the packing member in forming a seal around a slidable member passing through the packing member 10. Additionally, angling the interface 32 increases the surface area of the interface 32 thereby providing a larger surface for bonding upper portion 28 to lower portion 30 of packing member 10. The greater surface area provided by the angled interface results in a stronger bond between the upper portion 28 and the lower portion 30 of the packing member 10.

In conventional prior art "U" shaped packing members, the bottom of the "U" is positioned well below the inner sealing surface of the packing. Thus, a force applied radially against the inside sealing surface of a conventional "U" shaped packing member tends to cause the inside leg of the "U" to flex in a hinge-like manner around the bottom of the "U". In contrast, the inner sealing edge 25 of the packing member 10 of the present invention is positioned in the same horizontal plane as the bottom of the groove 20. Consequently, a force applied radially against the inside lip 24 of the packing member 10 of the present invention has a greater tendency to compress, rather than flex, the inside sealing lip 24. Thus, the amount of radially applied force required to deform inside sealing lip 24 is increased, further increasing the effectiveness of the packing member 10 in forming a seal around a slidable member passing through the packing member 10.

As best illustrated in FIG. 5, inner sealing lip 24 is inclined inwardly toward the center of opening 15 to form the sealing edge 25. Inner sealing lip 24 is inclined inwardly at an angle α beginning adjacent interface 32 and ending at inner sealing edge 25. Above inner sealing edge 25 the upper surface of inner sealing lip 24 has a generally semicylindrical configuration, terminating in groove 20. In the illustrated embodiment of the present invention, α is approximately 26°, however the angle α may vary with the specific application, for example within the range of from about 10° to about 30°.

Outer sealing lip 22 extends vertically beyond the top of inner sealing lip 24, terminating at horizontal surface 27. Surface 29 of sealing lip 22 is inclined outwardly at an angle β for sealing engagement with an outer chamber surrounding the packing member 10. As illustrated angle β is approximately 45°, however, depending upon the application, β may be varied, for example within the range of from about 15° to about 60°.

The operation of a device such as a hydraulic cylinder, typically involves both static and dynamic forces generated by the friction between the packing member and the shaft. Static friction must be overcome during the initial actuation of the cylinder whereas dynamic friction is encountered during continued movement of the shaft. The amount of friction between the shaft and the packing member is determined by a number of factors including the amount of surface area of the packing member in contact with the shaft. Preferably, the amount of friction between the shaft and the packing member is minimized while maintaining an effective seal.

In order to illustrate the advantages of the present invention, a test was conducted to compare the force required to push a piston through a packing member of the present invention verses a packing member of the type generally disclosed in U.S. Pat. No. 4,526,385. The test apparatus consisted of a three and seven eighths inch (3⅞") piston and a pair of stuffing boxes bolted together. Each of the stuffing boxes was fitted with a bearing, wiper and a packing member of the type disclosed and claimed herein. The stuffing box assembly was mounted in a frame with the piston passing through the stuffing boxes. The stuffing box assembly was pressurized with hydraulic fluid to 100, 300 and 500 psi and a winch was used to pull the piston through the pressurized stuffing box assembly. A 5000 pound force load cell, connected to the winch cable, was used to measure the force required to overcome static and dynamic resistance. The piston was pulled through the stuffing box assembly at a constant rate of approximately 10 ft/min. The peak force measured at the time the piston began moving was recorded as the static load. After the piston began moving additional readings were taken and averaged and reported as the dynamic load. The results of the test are set forth in Table 1 below.

TABLE 1

| PRESSURE | STATIC LOAD | DYNAMIC LOAD | RATIO-STATIC/ DYNAMIC LOADS |
|---|---|---|---|
| 100 psi | 120 lb. | 110 lb. | 1.09 |
| 300 psi | 170 lb. | 160 lb. | 1.06 |
| 500 psi | 220 lb. | 200 lb. | 1.10 |

The test was repeated with a packing member of the type generally disclosed in U.S. Pat. No. 4,526,385. The results of the test are set forth in Table 2 below.

TABLE 2

| PRESSURE | STATIC LOAD | DYNAMIC LOAD | RATIO-STATIC/ DYNAMIC LOADS |
|---|---|---|---|
| 100 psi | 175 lb. | 130 lb. | 1.35 |
| 300 psi | 215 lb. | 190 lb. | 1.13 |
| 500 psi | 345 lb. | 280 lb. | 1.23 |

As can be observed from a comparison of Tables 1 and 2, use of the packing member of the present invention results in lower friction and lower static/dynamic load ratios at all three pressure levels.

Figure 6:
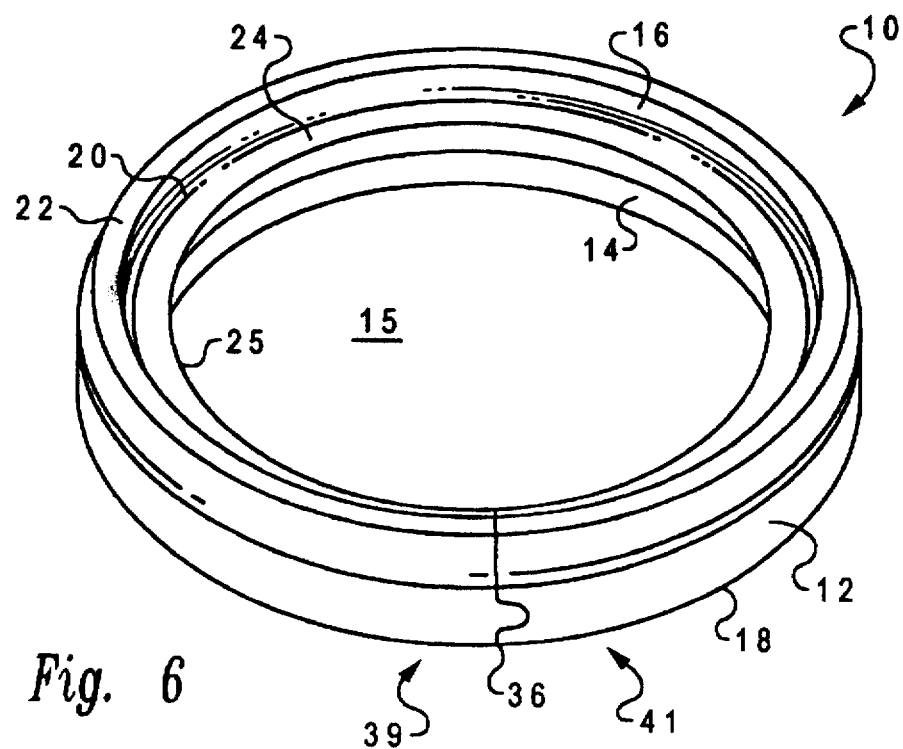
FIG. 6 is a perspective drawing of another alternate embodiment of the packing member of the present invention.
Figure 7:
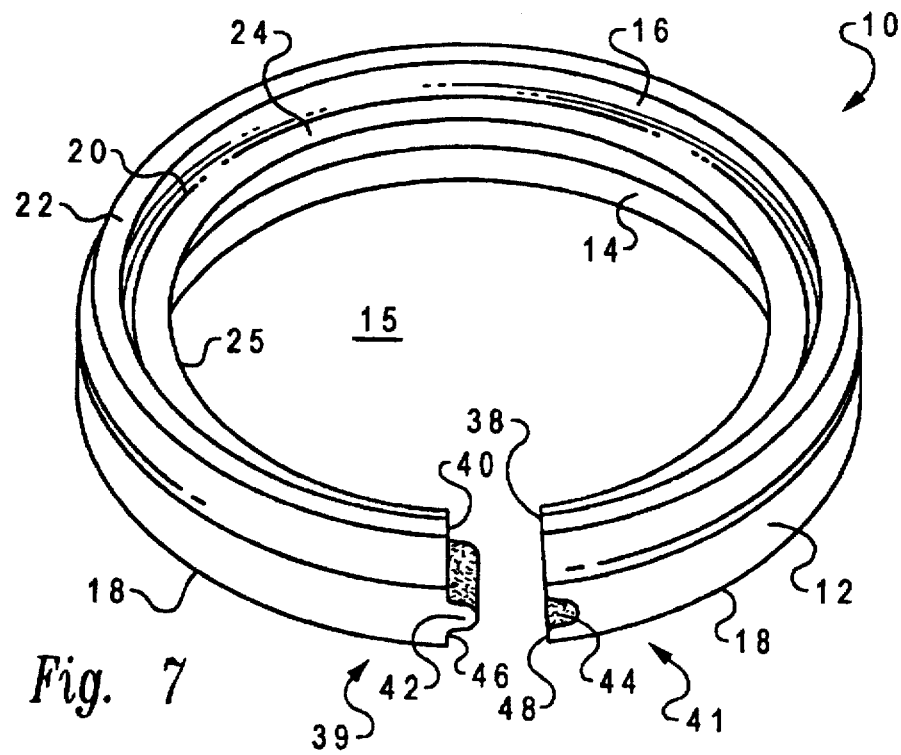
FIG. 7 is a partial perspective view of the alternate embodiment of the packing member illustrated in FIG. 6.

Turning now to FIGS. 6 and 7, yet another embodiment of the packing member of the present invention is illustrated. In many applications involving the use of hydraulic cylinders it is difficult and time consuming to disassemble the cylinder from the apparatus in which it is installed in order to replace the packing. For example, in the case of a "roped" hydraulic elevator or lifting device, it may be necessary to disassemble the sheave from the piston of the cylinder to install new packing if conventional non-split packing is used. In such applications, it may be desirable to use a split packing in order to avoid the necessity of disassembling the apparatus.

The use of conventional split packing has, however, several inherent disadvantages. Conventional split packing having a simple axially extending joint, either straight or angled, tends to leak at the location of the split in the packing. This tendency is exacerbated if the piston or plunger is even sightly out of dimension. Additionally, as noted above, the operation of a hydraulic cylinder involves both static and dynamic forces generated by the friction between the packing member and the shaft. These frictional forces are translated to axial forces during operation of a cylinder and tend to separate or pull apart a split seal at the location of the joint, thereby increasing the probability that the cylinder will leak during operation.

The embodiment of the packing member of the present invention illustrated in FIGS. 6 and 7 is, in all material respects, identical to the embodiment illustrated in FIG. 1 and described in the accompanying text except that packing member 10 is provided with a unique dovetail joint 36 extending radially through packing member 10 and having ends 39 and 41. As best illustrated in FIG. 7, a pair of substantially parallel opposing faces 38 and 40 extend axially downward from first end wall 16, spanning upper portion 28 (FIG. 5) and extending into lower portion 30 (FIG. 5) of the seal 10. Dovetail member 42 is thus completely formed from the harder, fabric reinforced lower portion 30. Upon installation of the seal 10, dovetail member 42 is matingly received in dovetail grove 44 for sealing engagement. A pair of opposed walls extend axially downward from dovetail member 42 and dovetail grove 44, terminating at second endwall 18.

In the case of a hydraulic cylinder using a conventional split packing which is simply cut along an axially extending plane, either straight or angled, hydraulic fluid need only be forced through the straight joint formed by the cut in order for the cylinder to leak. In contrast, in the embodiment of the packing member of FIGS. 6 and 7, before hydraulic fluid can leak through joint 36, it must pass around and between dovetail member 42 and dovetail grove 44, a longer and more circuitous path than presented in the case of convention split packing. Thus, the geometry of joint 36 presents greater resistance to leakage during operation. The geometry of joint 36 also provides greater resistance to axial forces resulting from friction between the packing member and the piston or plunger and thus tends to resist separation to a greater extent than conventional split packing. Additionally, by forming dovetail member 42 and dovetail grove 44 in the harder, fabric reinforced lower portion 30 (FIG. 5) of packing member 10, even greater resistance to separation is provided.

During installation, commercially available adhesives may be applied to joint 36 to provide even greater resistance to leakage. For example, the application of an isocyanide-type adhesive such as Eastman 910 during the installation of the packing member 10 results in the ends 39 and 41 of joint 36 being essentially fused together thereby providing essentially all of the advantages of a solid packing member. Other adhesives, such as silicon based cements may also be advantageously applied.

The combination of the unique geometry of packing member 10 of the present invention along with the use of a fabric reinforced lower portion 30 to stiffen and reinforce a softer, non-reinforced upper section 28 results in an improved packing member 10 that provides effective sealing with reduced friction. Additionally the present invention provides a packing member with not only reduced friction but also a reduced difference between static friction and dynamic friction, a highly desirable result.

Although the invention has been described in conjunction with the drawings and the foregoing Detailed Description, it will be understood that the invention is not limited to the embodiment disclosed, but is capable of numerous modifications without departing from the spirit and scope of the invention.

I claim:

1. A packing member comprising:
   an annular body comprising a relatively soft upper portion formed from an elastomeric polymeric material and a lower portion, said lower portion being harder than said upper portion, said upper and lower portions being bonded together along an interface, the lower portion being formed from a fabric reinforced elastomeric polymeric material, the annular body further defining an annular axis;
   said annular body having a circular outer wall and circular inner wall, with first and second end walls extending between the inner and outer walls;
   said annular body further defining a joint extending radially through said body;
   said annular body further defining a groove extending axially into said annular body through said first end wall, the groove having a lower wall, the lower wall of said groove defining a plane perpendicular to said annular axis;
   the upper portion of the annular body including radially inner and outer sealing lips formed adjacent to at least a portion of the groove, the outer sealing lip extending axially beyond the inner sealing lip;
   the inner sealing lip further comprising a radially inner sealing edge positioned adjacent the plane defined by the lower wall of the groove the upper surface of the inner sealing lip having a generally semicylindrical configuration;
   the inner sealing lip being inclined inwardly toward the annular axis for sealing engagement when in slidable contact with a separate moveable part; and
   the outer sealing lip being inclined outwardly for sealing engagement when in contact with a separate surrounding part.

2. The packing member of claim 1 wherein said upper portion is formed from an elastomeric polymeric material having a Shore A hardness of between about 60 and 85.

3. The packing member of claim 2 wherein said lower portion is formed from a fabric impregnated with an elastomeric polymeric material having a Shore A hardness of between about 70 and 90, but being greater than the Shore A hardness of the upper portion.

4. The packing member of claim 1 wherein the difference between the Shore A hardness of the elastomeric polymeric material used to form the upper portion and the Shore A hardness of the elastomeric polymeric material used to form the lower portion is from about 10 to about 30.

5. The packing member of claim 1 wherein the difference between the Shore A hardness of the elastomeric polymeric material used to form the upper portion and the Shore A hardness of the elastomeric polymeric material used to form the lower portion is about 20.

6. The packing member of claim 1 wherein the plane defined by the lower wall of the groove intersects the inner sealing edge.

7. The packing member of claim 1 wherein the inner sealing lip is inclined inwardly from the interface toward the annular axis at an angle of from about 10° to about 30° to form the sealing edge.

8. The packing member of claim 1 wherein said joint is a dovetail joint.

9. A packing member comprising:
   an annular body comprising a relatively soft upper portion formed from an elastomeric polymeric material having a Shore A hardness of between about 60 and 85, and a harder lower portion, said upper and lower portions being bonded together along an interface, the lower portion being formed from a fabric reinforced elastomeric polymeric material having a Shore A hardness of between about 70 and 90, but being greater than the Shore A hardness of the upper portion, the annular body further defining an annular axis;
   said annular body having a circular outer wall and circular inner wall, with first and second end walls extending between the inner and outer walls;
   said annular body defining a dovetail joint extending radially through said annular body;
   said annular body further defining a groove extending axially into said annular body through said first end wall, the groove having a lower wall, the lower wall of said groove defining a plane perpendicular to said annular axis;
   the upper portion of the annular body including radially inner and outer sealing lips formed adjacent to at least a portion of the groove, the outer sealing lip extending axially beyond the inner sealing lip;
   the inner sealing lip further comprising a radially inner sealing edge positioned adjacent the plane defined by the lower wall of the groove the upper surface of the inner sealing lip having a generally semicylindrical configuration;
   the inner sealing lip being inclined inwardly toward the annular axis for sealing engagement when in slidable contact with a separate moveable part; and
   the outer sealing lip being inclined outwardly for sealing engagement when in contact with a separate surrounding part.

10. The packing member of claim 9 wherein the difference between the Shore A hardness of the elastomeric polymeric material used to form the upper portion and the Shore A hardness of the elastomeric polymeric material used to form the lower portion is from about 10 to about 30.

11. The packing member of claim 9 wherein the difference between the Shore A hardness of the elastomeric polymeric material used to form the upper portion and the Shore A hardness of the elastomeric polymeric material used to form the lower portion is about 20.

12. The packing member of claim 9 wherein the plane defined by the lower wall of the groove intersects the inner sealing edge.

13. The packing member of claim 9 wherein the inner sealing lip is inclined inwardly from the interface toward the annular axis at an angle of from about 10° to about 30° to form the sealing edge.

14. The packing member of claim 9 wherein said dovetail joint further comprises a dovetail member and a dovetail groove for mating engagement with the dovetail member.

15. The packing member of claim 9 wherein the relatively soft upper portion formed from a nitrile rubber having a Shore A hardness of between about 60 and 85 and wherein the harder lower portion is formed from a fabric reinforced nitrile rubber having a Shore A hardness of between about 70 and 90.

16. A packing member comprising:
   an annular body comprising a relatively soft upper portion formed from an elastomeric polymeric material having a Shore A hardness of between about 60 and 85, and a harder lower portion, said upper and lower portions being bonded together along an interface, the lower portion being formed from a fabric reinforced elastomeric polymeric material having a Shore A hardness greater than the Shore A hardness of the upper portion, the annular body further defining an annular axis;

said annular body having a circular outer wall and circular inner wall, with first and second end walls extending between the inner and outer walls;

said annular body defining a dovetail joint, the dovetail joint comprising a dovetail member and a dovetail groove for mating engagement with the dovetail member;

said annular body further defining a groove extending axially into said annular body through said first end wall, the groove having a lower wall, the lower wall of said groove defining a plane perpendicular to said annular axis;

the upper portion of the annular body including radially inner and outer sealing lips formed adjacent to at least a portion of the groove, the outer sealing lip extending axially beyond the inner sealing lip;

the inner sealing lip further comprising a radially inner sealing edge intersected by the plane defined by the lower wall of said groove the upper surface of the inner sealing lip having a generally semicylindrical configuration;

the inner sealing lip being inclined inwardly at an angle of from about 10° to about 30° to form said sealing edge for sealing engagement when in slidable contact with a separate moveable part; and the outer sealing lip being inclined outwardly for sealing engagement when in contact with a separate surrounding part.

17. The packing member of claim 16 wherein the difference between the Shore A hardness of the elastomeric polymeric material used to form the upper portion and the Shore A hardness of the elastomeric polymeric material used to form the lower portion is from about 10 to about 30.

18. The packing member of claim 16 wherein the difference between the Shore A hardness of the elastomeric polymeric material used to form the upper portion and the Shore A hardness of the elastomeric polymeric material used to form the lower portion is about 20.

19. The packing member of claim 16 wherein the dovetail member and dovetail grove are formed in said lower portion.

20. A packing member comprising:

an annular body comprising a relatively soft upper portion formed from an elastomeric polymeric material having a Shore A hardness of between about 60 and 85, and a harder lower portion, said upper and lower portions being bonded together along an interface, the lower portion being formed from a fabric reinforced elastomeric polymeric material, the difference in the Shore A hardness of said upper portion and said lower portion being from about 10 to 30, the annular body further defining an annular axis;

said annular body having a circular outer wall and circular inner wall, with first and second end walls extending between the inner and outer walls;

said annular body defining a dovetail joint, the dovetail joint comprising a dovetail member and a dovetail groove for mating engagement with the dovetail member, said dovetail member and dovetail groove formed in said lower portion;

said annular body further defining a groove extending axially into said annular body through said first end wall, the groove having a lower wall, the lower wall of said groove defining a plane perpendicular to said annular axis;

the upper portion of the annular body including radially inner and outer sealing lips formed adjacent to at least a portion of the groove, the outer sealing lip extending axially beyond the inner sealing lip;

the inner sealing lip further comprising a radially inner sealing edge intersected by the plane defined by the lower wall of said groove the upper surface of the inner sealing lip having a generally semicylindrical configuration;

the inner sealing lip being inclined inwardly at an angle of from about 10° to about 30° to form said sealing edge for sealing engagement when in slidable contact with a separate moveable part; and the outer sealing lip being inclined outwardly for sealing engagement when in contact with a separate surrounding part.

* * * * *